Dec. 25, 1951    L. J. ROSSEAU    2,579,866
MOTOR VEHICLE CLEANING APPARATUS HAVING
ROTARY BRUSH MOUNTED ON PIVOTED CARRIER
Filed Aug. 3, 1944    4 Sheets-Sheet 2

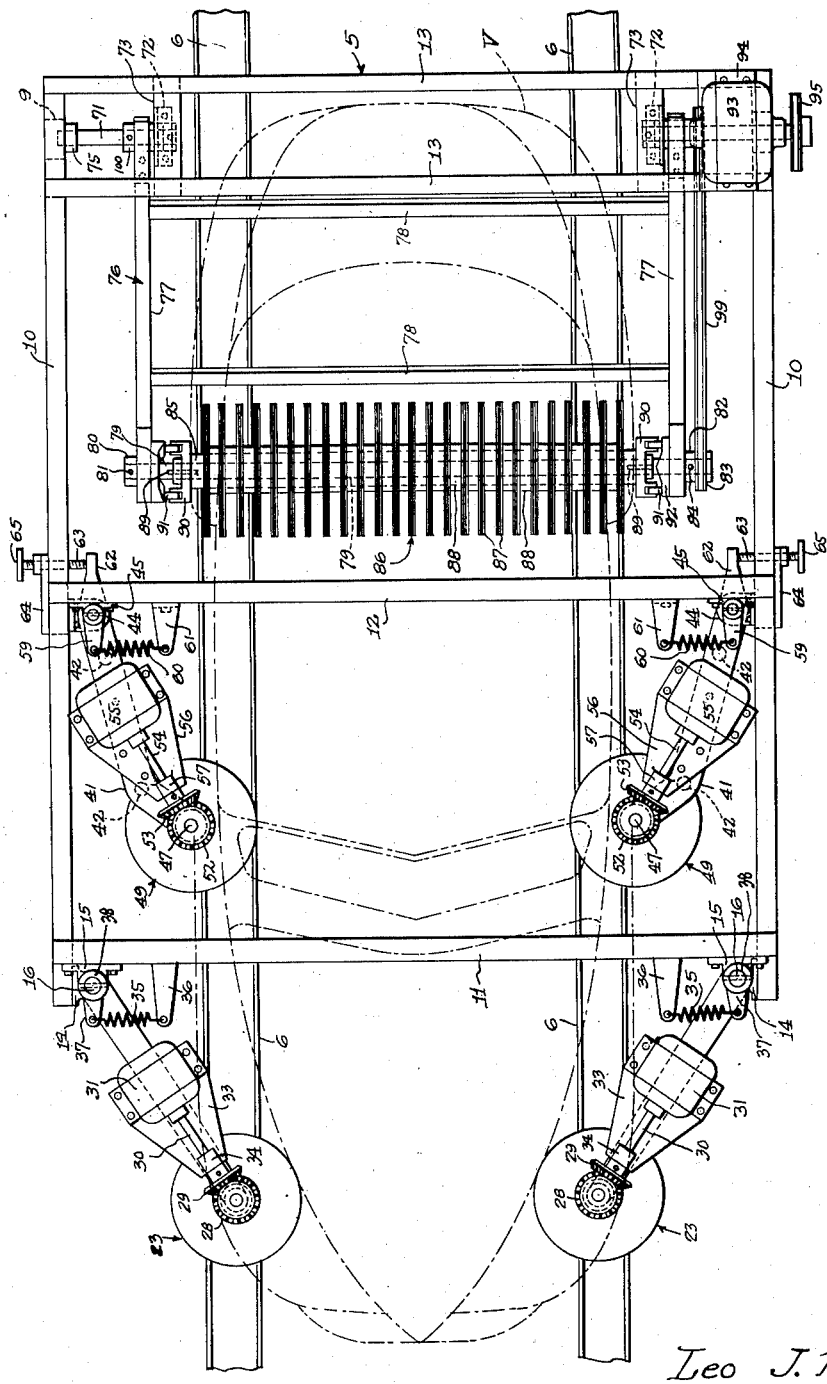

Inventor
Leo J. Rousseau
By Barthel and Bugbee
Attorneys

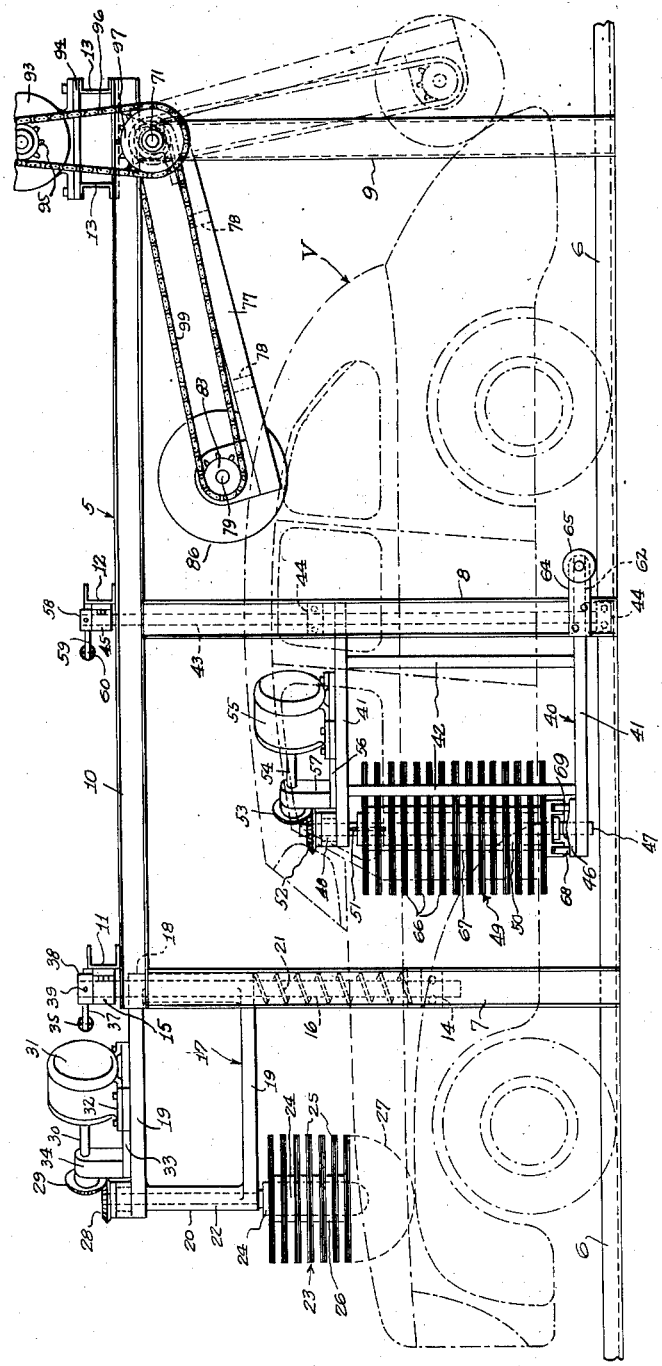

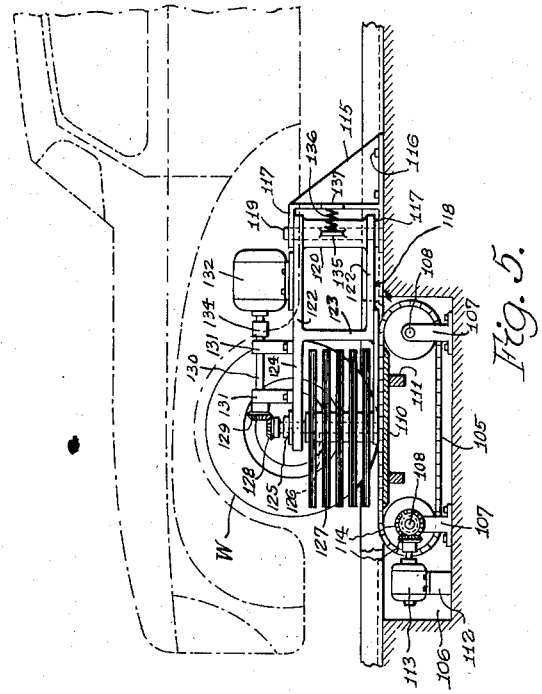

Patented Dec. 25, 1951

2,579,866

UNITED STATES PATENT OFFICE 2,579,866

MOTOR VEHICLE CLEANING APPARATUS HAVING ROTARY BRUSHES MOUNTED ON PIVOTED CARRIERS

Leo J. Rousseau, Grosse Pointe, Mich., assignor, by mesne assignments, to Minit-Man, Inc., Detroit, Mich., a corporation of Michigan Application August 3, 1944, Serial No. 547,837

5 Claims. (Cl. 15—21)

The present invention relates to improvements in cleaning, washing and scrubbing apparatus for motor vehicles.

The primary object of the invention is to provide a cleaning apparatus which will quickly and conveniently clean vehicles such as automobiles and the like in a relatively short time and which may be employed for cleaning vehicles of usual body contour and design without necessitating laborious manual operations during the cleaning operation.

Another object of the invention is to provide a vehicle washing and cleaning apparatus in which the vehicle to be cleaned is conveyed through the various cleaning stations so that the vehicle will be washed, scrubbed and rinsed as it passes along the conveyor way in a relatively short period of time.

Another object of the invention is to provide a motor vehicle cleaning and washing apparatus of the above-mentioned type in which all of the various body surfaces of the vehicle will be cleaned by a series of uniquely positioned motor driven rotary brushes so disposed and arranged as to facilitate the cleaning and scrubbing of such body surfaces of the vehicle as the top, fenders and apron in a single cleaning operation as the vehicle is conveyed or passed through the cleaning apparatus.

Another object of the invention is to provide a motor vehicle cleaning, washing and scrubbing apparatus in which the cleaning or scrubbing brushes are mounted for oscillation toward and away from the vehicle body on opposite sides thereof to compensate for the irregular body surface being operated upon and to yieldingly urge certain of said brushes inwardly in the direction of said vehicle from opposite sides of said vehicle whereby said brushes may yieldingly engage the vehicle body surfaces under sufficient tension to remove dirt and the like therefrom without marring or scratching the vehicle body finish.

Another object of the invention is to provide a vehicle cleaning apparatus of the above-mentioned type in which the vehicle is propelled or driven onto an endless conveyor so that the wheels of the vehicle may be rotated while engaged by a rotary motor-driven brush presented to the conveyor and engageable with the vehicle wheels.

Other objects and advantages will become apparent during the course of the following description of the accompanying drawings, wherein:

Figure 1 is a plan view of the vehicle body cleaning and scrubbing apparatus embodying the invention illustrating the manner in which the various cleaning brushes are disposed and arranged for cleaning the irregular body surfaces of the motor vehicle;

Figure 2 is a side elevational view of the invention illustrating the position of the cleaning and scrubbing brushes during the passage of a vehicle through the cleaning apparatus;

Figure 4 is a top plan view of a modified form of the invention illustrating a wheel cleaning mechanism; and Figure 5 is a side elevational view of the wheel cleaning mechanism shown in Figure 4.

Figure 3:
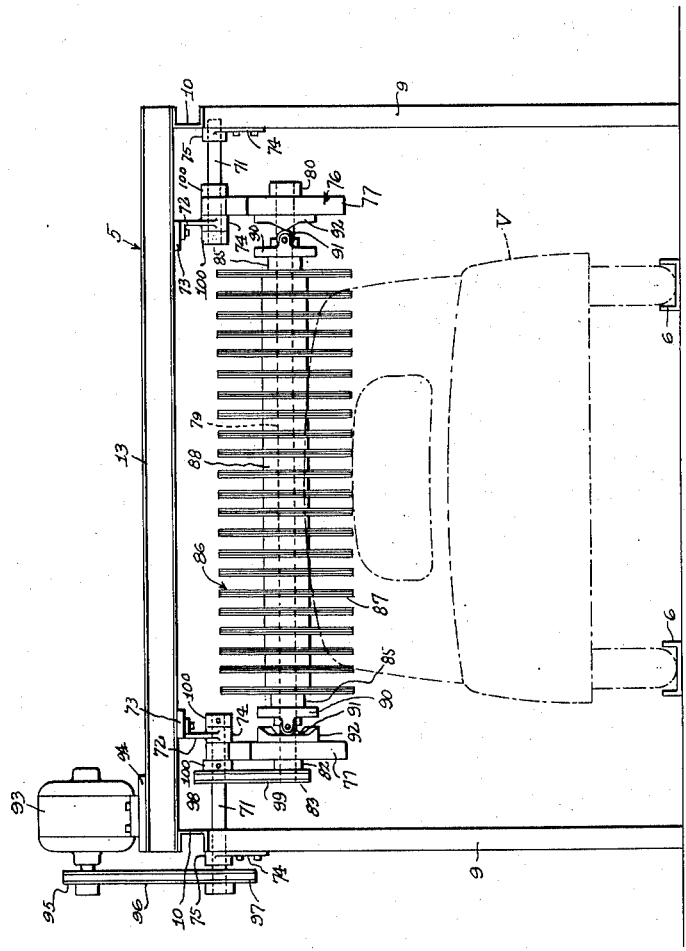
Figure 3 is a rear elevational view of the cleaning apparatus showing the horizontal brush for cleaning the top of the hood and body of the vehicle during the passage of the vehicle therebeneath.

In the drawing, wherein for the purpose of illustrating the invention like reference characters will be employed throughout, the reference character 5 will generally be employed to designate a fabricated frame structure disposed above a conveyor pathway having guide channels 6 for receiving the wheels of the vehicle to be cleaned. The conveyor channelways 6 may be imbedded in the floor of the cleaning plant in spaced apart parallel relation, and a suitable chain conveyor mounted therebetween having a flight arm for engaging the vehicle to convey the same along the pathway.

The fabricated frame structure 5 is comprised of a series of uprights 7, 8 and 9 arranged in pairs disposed on opposite sides of the channelway 6. The lower ends of the vertical uprights are embedded in the concrete flooring in the same fashion as the channelway 6 and the upper ends of the uprights are connected by horizontal longitudinal I-beams 10 likewise disposed on opposite sides of the channelway 6. Transversely extending channel beams 11, 12 and 13 bridge the horizontal channel beams 10 directly above the respective uprights 7, 8 and 9, thereby completing the frame structure and said beams may be fastened together in the conventional manner as by means of rivets or nuts and bolts.

Secured to each of the uprights 7 adjacent the lower portion thereof is a bearing bracket 14 and mounted on the transverse horizontal channel member 11 in vertical alignment with the bearing bracket is a similar bearing bracket 15. The bearing brackets 14 and 15 are adapted to support vertical shafts 16 for accommodating an oscillatable bracket 17 having a tubular bearing portion 18, parallel arm portions 19 and a tubular bearing portion 20 connecting the ends thereof. A coil spring 21 encircles each of the shafts 16 and has its lower end in abutting relationship with the bearing bracket 14 and its upper end in engagement with the tubular bearing portion 18 of the oscillatable bracket 17. Rotatably mounted in the tubular bearing portion 20 of the oscillatable bracket 17 is a vertical shaft 22 having an enlarged lower end portion upon which is supported a rotary brush 23. The rotary brush 23 may comprise a series of bristles carried by the hub portion 24 or a series of spaced discs 25 formed of fabric or the like suitably held in place and spaced by spacers 26. The lower portion of the flexible brush 23 will be arcuately curved as at 27 to conform to various body contours of the motor vehicle. The upper end of the shaft 22 is provided with a bevel gear 28 adapted to be drivingly engaged by a bevel gear 29 secured to the armature shaft 30 of an electric motor or the like as at 31. The base 32 of the motor 31 is secured to a platform 33 by bolts or the like and said platform is welded or otherwise secured to one of the arms 19 of the oscillatable frame 17. A bearing support 34 is formed on the platform support 33 to support the free end of the armature shaft 30.

The rotary brushes 23 are yieldingly urged inwardly toward one another by means of coil springs 35 which have one of their ends hooked in an aperture in an arm extension 36 secured to the horizontal channel beam 11 and the opposite end of the coil spring is received in an opening in an arm 37 secured to the shaft 16. The collar 38 of the arm 37 is affixed to the shaft by means of a transverse locking key 39. The rotary brushes 23 are adapted to engage the apron and side portions of the vehicle hood during the passage of the vehicle through the washing apparatus and the curved portion 27 of each brush 23 is adapted to engage the arcuate surface between the hood and the fender of the vehicle as indicated in Figure 2.

Pivotally secured to the vertical upright 8 on each side of the trackway 6 is an oscillatable frame 40 having parallel horizontal arms 41 connected adjacent the free ends by vertical bar members 42. The inner ends of the parallel horizontal bar members 41 are pivotally secured to a shaft 43 supported on the upright 8 by means of suitable bearing brackets 44 and 45 bolted to the uprights 8 and horizontal transverse channel beam 12 respectively. The oscillatable frames 40 are mounted to swing in a horizontal plane on the vertical shafts 43 in substantially the same manner as described in connection with the oscillatable swinging frame 17.

One of the horizontal parallel bars 41 of each oscillatable frame 40 is provided with a bearing member 46 for receiving the rotary shaft 47 the upper end of which is journalled in a suitable bearing member 48 carried by the free swinging end of the upper horizontal parallel bar 41 of the oscillatable frame 40. A rotary brush 49 has its hub portion 50 slidably mounted on the rotary shaft 47 and keyed thereto by means of a suitable key 51 so as to permit vertical sliding movement of the brush 49 but prevent relative rotation between the brush and the shaft. Secured to the extreme upper end of the rotary shaft 47 is a bevel gear 52 adapted to be drivingly engaged by a bevel gear 53 on the armature shaft 54 of an electric motor 55. The electric motor 55 has its base bolted or otherwise secured to a platform 56 secured to the upper parallel horizontal swinging arm 41 and a vertical bearing support 57 secured to the platform 56 for supporting the armature shaft 54 and preventing movement of the gear 53 out of engagement with the gear 52.

The upper end of the shaft 43 is provided with a collar 58 having a radially extending arm 59 to which is attached a coil spring 60 which has it other end received in a suitable aperture in a bracket arm 61 secured to the horizontal channel member or beam 12. The lowermost horizontal swinging arm 41 of the oscillatable swinging frame 40 is provided with an extension 62 for being engaged by a stop screw 63 adjustably mounted in the bracket plate 64 affixed to the lower portion of the vertical standard 8 by bolts or the like. A hand wheel 65 is secured to the outer end of the adjusting screw 63 to facilitate rotation of the adjusting screw and the movement thereof into the path of the arm 62 to limit the inward swinging movement of the oscillatable bracket 40 and the rotary brushes 49. The rotary brushes 49 may be formed in substantially the same manner as described in connection with the rotary brushes 43 and may comprise a series of flexible disc-like sheets of fabric 66 held in spaced relation on the hub 50 by suitable spacing collars 67.

The horizontally swinging brushes 49 are adapted to swing inwardly and be yielding urged into engagement with the side walls of the vehicle body on opposite sides thereof so as to remove dirt and foreign matter therefrom when the vehicle is being passed through a washing and scrubbing appartus, and if desired, the brushes 49 may be given a slight reciprocating motion by providing rollers 68 on the lower portion of the hub 50 which are adapted to engage a cam trackway 69 on the bearing member 46 so that as the brushes are rotated, the hub 50 of the brush will be reciprocated to increase the cleansing action of the brush on the vehicle body.

It is to be noted that the transverse bracing means for the fabricated frame structure comprises parallel channel beams 13 spaced apart a sufficient distance as indicated in Figure 1 for supporting a horizontal rotary brush to swing vertically about a horizontal axis. As shown in Figure 3, a pair of relatively short shafts 71 are mounted at each side of the fabricated frame structure and are supported at their inner ends by downwardly depending bearing arms 72 bolted or otherwise secured to transverse bracket plates 73 affixed to the underside of the channel beams. A bearing portion 74 is formed in the bearing bracket 72 to support the inner end of the shaft 71 as indicated in Figures 1 and 3. The outer ends of the shaft 71 are supported in the bearing brackets 74 bolted or otherwise secured to the upper ends of the vertical standards 9. Each of the bearing brackets 74 is provided with a bearing portion 75 for accommodating the shafts. Oscillatably mounted on the shaft 71 is a rotary brush supporting frame 76 which is similar in construction to the brush supporting frames 17 and 40 and includes a pair of parallel side bars 77 connected by transverse parallel bars 78. The inner ends of the bars 77 are mounted upon the shaft 71 and the free swinging ends thereof are adapted to support a rotary shaft 79 having one end held in place by a collar 80 keyed thereto as at 81 and the opposite end held against the lateral movement by the collar 82 of a pulley or the like 83. The collar 82 is provided with a transverse locking pin 84 similar to the locking pin 81. Rotatably carried by the shaft 79 is the hub 85 of a rotary brush 86 which may be formed of a series of flexible disc fabric members 87 suitably spaced and held in place by spacing collars 88. The hub 85 is slidably mounted on the shaft 79 on longitudinal keys 89 so as to permit longitudinal sliding movement thereof but prevent relative rotation. Each end of the hub 85 is provided with a disc 90 having a series of diametrically opposed rollers 91 for engaging cam tracks 92 affixed to the arms 77. An electric motor 93 is supported on a suitable platform 94 extending between and connected to the parallel channel beams 13 and said electric motor has its armature shaft provided with a pulley 95 for receiving a belt 96 or the like trained over a pulley 97 on one of the shafts 71. The shaft 79 is rotated through the medium of a pulley 98 on one of the shafts 71 keyed or otherwise secured thereto over which is trained a belt 99 in driving relation with the pulley 83 on said shaft. Retaining collars 100 are secured to the inner ends of the shafts 71 on each side of the bearing brackets 72 and arms 77 so as to prevent longitudinal displacement of the shafts 71.

In the modification shown in Figures 4 and 5, an endless conveyor 105 is mounted in a recess 106 which interrupts the channelways 6 so that said conveyor will bridge the gap formed by said interruption and permit the continued travel of the vehicle after it has been momentarily arrested, for the purpose of cleaning the wheels of the vehicle. It is intended to form said longitudinal recesses 106 in the vehicle pathway adjacent the uprights 7 of the fabricated frame structure so that a wheel cleaning mechanism can be installed beneath the oscillatable brush supporting frame 17 (Figures 2, 4 and 5). In the drawing, the recesses 106 in the pathway 6 are provided with bearing brackets 107 fastened in place by suitable bolts or the like and said brackets are formed with spaced arms having bearing openings for receiving shafts 108. Secured to each of the rotary shafts 106 is a drum 109 for supporting the conveyor belts 105 which are flexible and are provided with a supporting plate 110 arranged therebeneath to support the weight of the vehicle. The backing plates 110 are secured to transverse supports 111 having their ends secured to the vertical walls of the recesses.

Also supported in each of the recesses 106 is a bracket 112 for supporting a motor 113 which is drivingly connected with one of the shafts 108 by suitable gearing 114.

Mounted between the vertical uprights and on opposite sides of the pathway 6 is a bracket 115 having its base flange anchored to the floor by bolts or the like 116. The other flange of each of the brackets is provided with spaced lugs 117 arranged in opposed relation for supporting an oscillatable brush supporting frame 118. A pivot pin 119 is extended through a tubular bearing member 120 formed on the oscillatable frame and has its ends received in said lugs 117. The oscillatable brush supporting frame 118 includes upper and lower spaced parallel frame bars 122 connecting the tubular bearing portion 120 while the opposite ends are connected to a frame bar 123. The uppermost frame bar 122 of each oscillatable frame is extended as at 124 and has affixed to the end thereof a bearing member as at 125.

Extending through the bearing member 125 is a rotary shaft 126 upon which is fixed a rotary brush 127 formed of flexible fabric or bristles in a similar manner to the brushes shown in Figures 1 to 3 inclusive. One end of each of the shafts is provided with a bevel pinion gear 128 adapted to mesh with a bevel pinion gear 129 on a drive shaft 130 supported in suitable bearing brackets 131 secured to the uppermost frame bar 122. Also supported on each of the oscillatable brush supporting frames 118 is an electric motor 132 having the armature shaft drivingly connected to the shaft 130 by a suitable coupling 134.

Formed in the tubular bearing portion of each of the oscillatable brush supporting frames 118 is an extension 135 for being engaged by a coil spring 136 so as to yieldingly urge said frames toward one another and centrally with respect to the vehicle pathway 6. A projection 137 is formed on each bracket 115 for engaging the opposite end of the coil spring 136 and forming an abutment therefor. Also projecting from each frame 118 is a limiting stop 139 for engaging a stop screw 140 carried by said brackets to limit the inward swinging movement of the oscillatable frame and maintain the rotary brushes 137 in position for engaging the wheels W of the vehicle V.

In operation, the vehicle V is conveyed or driven forward through suitable liquid spray apparatus and is finally passed through the fabricated frame structure after being sufficiently wetted to dissolve a portion of the dirt on the vehicle so that the horizontally swinging brushes 23 and 49 will engage the various surfaces and body contours of the vehicle such as the hood, side panels, and outer portions of the fenders and exert a brushing action on the wetted body surfaces. Initially, the front portion of the hood is engaged by the vertically swinging horizontally rotating and reciprocating brush 86 to remove dirt and foreign matter from the central portion of the vehicle hood as well as the top as indicated in Figure 2. After the vehicle has advanced a slight distance the rotary brushes 49 engage the outer side portions of the fender to similarly remove dirt and foreign matter therefrom. Upon continued travel of the vehicle V, the rotary brushes 23 engage the fender wells between the hood and fenders so as to scrub the fender well portions and the panel portions of the hood. As this occurs, the rotary brush 86 will be in an elevated position to scrub and cleanse the top wall of the vehicle and upon further continued movement of the vehicle, the brush 86 will swing downwardly by gravity to cleanse and scrub the rear portion of the top and apron of the vehicle. By reason of the spring tension, yieldingly urging the brushes 23 and 49 toward one another, the correct pressure may be applied to the brushes to insure the proper cleansing action and facilitate the removal of dirt and foreign matter from the vehicle body. After the vehicle has passed through the scrubbing and cleansing apparatus, the horizontal rotary brush 86 will swing to the limit of its downward movement as indicated in dotted lines in Figure 2, so that the crest of the hood of the next vehicle passing therethrough will engage said brush and permit the same to be elevated to various positions conforming to the body contour of the vehicle.

For consideration of the operation of the modification shown in Figures 4 and 5, it will be assumed that the wheel cleansing brushes 127 are installed beneath the brushes 25 and below the oscillatable rotary brush supporting arms 17 and that the vehicle V has been driven or conveyed to the conveyor treads 105 so that the wheels W thereof will rest on said treads momentarily.

With the vehicle in this position, the motor 113 is energized to cause said wheels W to be rotated as they pass onto said conveyor tread 105 and until they pass to the channelways 6. While the rotary brushes 23 are cleaning the fenders and hood portions of the vehicle V, the brushes 127 will engage the wheels W thereof and cause said wheels to be cleansed and brushed simultaneously with the cleaning by the brushes 23.

As the vehicle V travels forwardly after the front wheels of the vehicle have been cleaned, the rear wheels are rolled onto the conveyor treads so that they may be cleaned while the vehicle is momentarily arrested. If desired, the rotary brushes 127 and oscillatable frames 120 supporting the same may be supported on the vertical uprights 7 of the fabricated frame structure and the vehicle pathway including the channelways 6 may be interrupted at any convenient location to permit the installation of the conveyor treads 105.

The vehicle V is then passed through a drying process to dry the various body surfaces and, if desired, the parts of the body not acted upon by the rotary brushes may be manually cleaned by wiping the same with a chamois or other cloth.

It is to be understood that the form of the invention herewith shown and described is to be taken as a preferred embodiment of the same and that various changes may be made in the shape, size and arrangement of parts without departing from the spirit of the invention or the scope of the subjoined claims.

What I claim is:

1. In a machine for cleaning the irregular body contours of vehicles movable along a vehicle pathway, a frame positioned adjacent said vehicle pathway, a brush carrier movably mounted on said frame for generally horizontal motion toward and away from a vehicle on said pathway, yielding means connected to said brush carrier for yieldingly urging said carrier toward the body of a vehicle on said pathway, a vertical motor-driven shaft journaled on said brush carrier and movable therewith toward and away from said vehicle body, and a rotary brush on said shaft having a side portion and a convexly-rounded portion thereon engageable with said irregular body contours.

2. In a machine for cleaning the irregular body contours of vehicles movable along a vehicle pathway, a frame positioned adjacent said vehicle pathway, a brush carrier movably mounted on said frame for generally horizontal motion toward and away from a vehicle on said pathway, yielding means connected to said brush carrier for yieldingly urging said carrier toward the body of a vehicle on said pathway, a vertical motor-driven shaft journaled on said brush carrier and movable therewith toward and away from said vehicle body, and a rotary brush on said shaft having a roughly cylindrical side portion and a convexly-rounded end portion thereon engageable with said irregular body contours.

3. In a machine for cleaning the irregular body contours of vehicles movable along a vehicle pathway, a frame positioned adjacent said vehicle pathway, a brush carrier movably mounted on said frame for generally horizontal motion toward and away from a vehicle on said pathway, yielding means connected to said brush carrier for yieldingly urging said carrier toward the body of a vehicle on said pathway, a vertical motor-driven shaft journaled on said brush carrier and movable therewith toward and away from said vehicle body, and a rotary brush on said shaft depending from said brush carrier and having a side portion and a convexly-rounded portion on the lower end thereof engageable with said irregular body contours.

4. In a machine for cleaning vehicles movable along a vehicle pathway, a motor-driven endless tread device mounted in said pathway for engagement by and beneath a wheel of said vehicle on said pathway and connected to rotate said wheel independently of the normal rotation thereof resulting from the motion of said vehicle along said pathway, a support positioned adjacent said tread device, an oscillatable brush carrier movably mounted on said support for motion toward and away from the side of said wheel, yielding means connected to said brush carrier for yieldingly urging said carrier toward the side of said wheel, and a motor-driven rotary brush mounted on said brush carrier and movable therewith into engagement with the side of said wheel.

5. In a machine for cleaning vehicles movable along a vehicle pathway, a motor-driven endless tread device mounted in said pathway for engagement by and beneath a wheel of said vehicle on said pathway and connected to rotate said wheel independently of the normal rotation thereof resulting from the motion of said vehicle along said pathway, a support positioned adjacent said tread device, an oscillatable brush carrier movably mounted on said support for motion in a generally horizontal direction toward and away from the side of said wheel, yielding means connected to said brush carrier for yieldingly urging said carrier toward the side of said wheel, and a motor-driven rotary brush mounted with its axis of rotation disposed vertically on said brush carrier and movable therewith into engagement with the side of said wheel.

L. J. ROUSSEAU.

REFERENCES CITED

The following references are of record in the file of this patent:

UNITED STATES PATENTS

| Number | Name | Date |
| --- | --- | --- |
| 1,823,222 | Whitsitt | Sept. 15, 1931 |
| 1,909,869 | Randrup | May 16, 1933 |
| 1,962,167 | Zimmer | June 12, 1934 |
| 2,025,780 | Rosebrook | Dec. 31, 1935 |
| 2,253,539 | Steinhilber | Aug. 26, 1941 |
| 2,257,255 | Yingling | Sept. 30, 1941 |
| 2,318,996 | Holmes | May 11, 1943 |

FOREIGN PATENTS

| Number | Country | Date |
| --- | --- | --- |
| 113,999 | Germany | Feb. 1, 1899 |